July 18, 1944.                B. H. SKELLY                2,354,070
                    AUTOMOBILE THEFT PREVENTING DEVICE
                 Filed Sept. 29, 1941          3 Sheets-Sheet 1
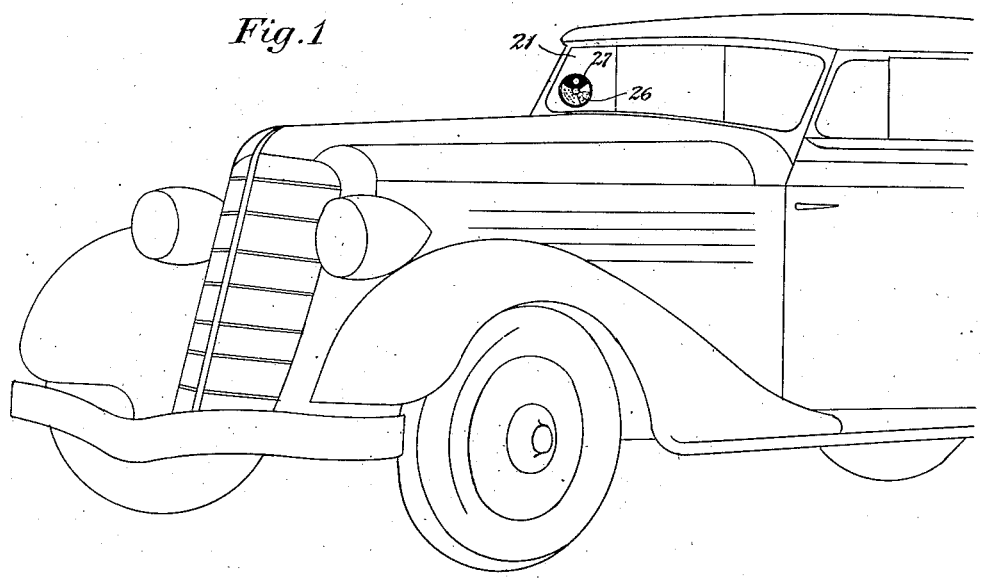
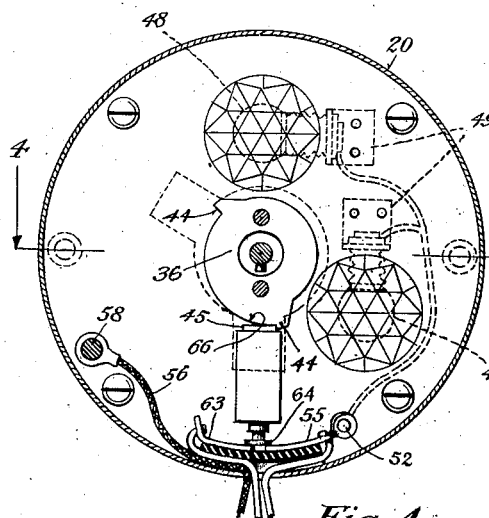
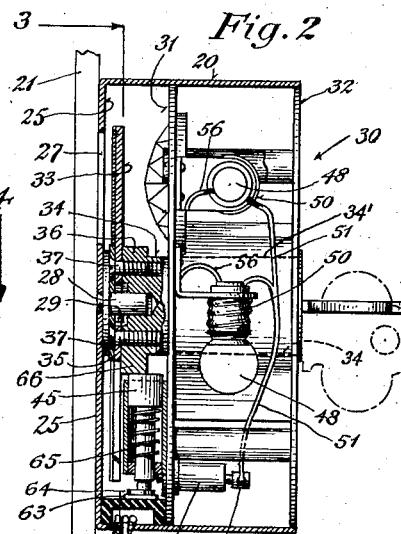
INVENTOR
Bernard H. Skelly,
BY Johnson Kline + Smyth
ATTORNEYS July 18, 1944.  B. H. SKELLY  2,354,070
AUTOMOBILE THEFT PREVENTING DEVICE
Filed Sept. 29, 1941  3 Sheets-Sheet 2
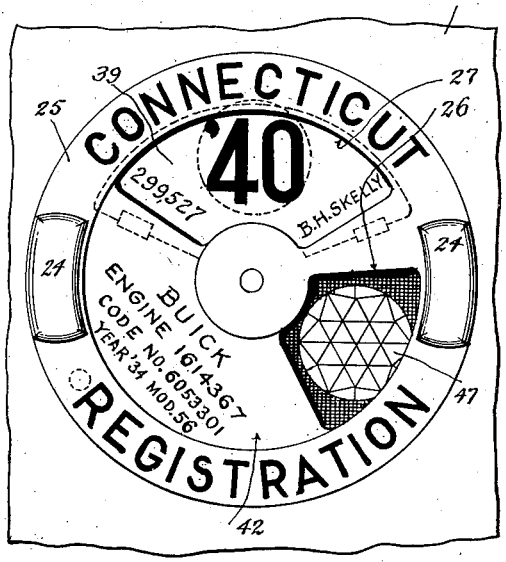
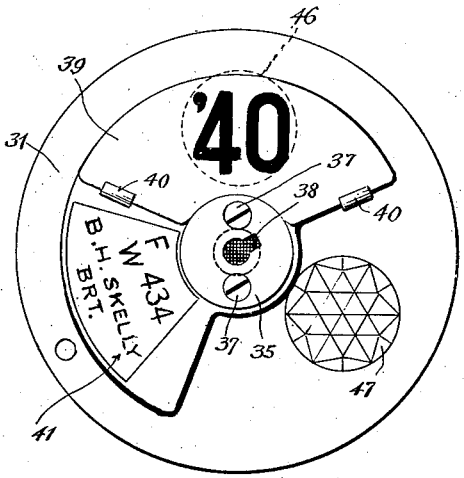
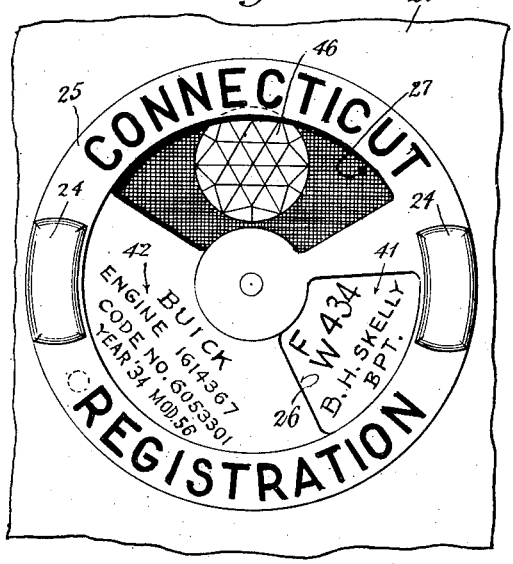
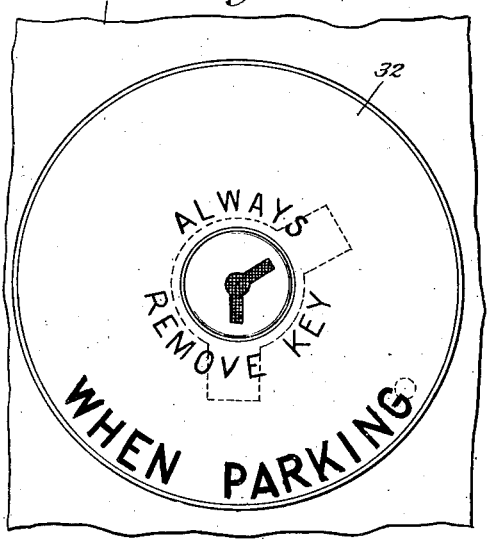
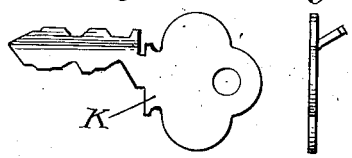
INVENTOR
*Bernard H. Skelly*
BY *Johnson, Kline & Smyth*
ATTORNEYS July 18, 1944.  B. H. SKELLY  2,354,070
AUTOMOBILE THEFT PREVENTING DEVICE
Filed Sept. 29, 1941  3 Sheets-Sheet 3

INVENTOR
*Bernard H. Skelly,*
BY *Johnsen, Kline & Smyth*
ATTORNEYS

Patented July 18, 1944

2,354,070

UNITED STATES PATENT OFFICE 2,354,070

AUTOMOBILE THEFT PREVENTING DEVICE

Bernard H. Skelly, Bridgeport, Conn.; Frances A. Skelly administratrix of said Bernard H. Skelly, deceased Application September 29, 1941, Serial No. 412,777

12 Claims. (Cl. 40—15)

This invention relates to an accessory to be mounted to a motor vehicle for indicating whether or not the vehicle is being operated by the licensed operator or his agent.

The accessory of the present invention is designed to effectively prevent theft of motor vehicles and comprises means for displaying visible signals and certain indicia peculiar to the vehicle and the licensed operator thereof for indicating whether or not the vehicle is occupied and being driven by the licensed operator or his agent.

Accordingly, the accessory is mounted on some position on the vehicle in which it is clearly visible, and preferably is mounted interiorly of the vehicle so as to be visible through the windshield of the same.

The accessory comprises a casing housing a pair of signals, and a holder for carrying the indicia. The indicia holder is movable to alternate positions relative to the casing, and in either position of the holder, one or the other of the signals is concealed thereby.

In the preferred embodiment of the present invention, as illustrated, the position of the holder is under the control of the licensed operator, and to this end, the holder is mounted to a lock barrel, rotatably mounted in the casing, and operable by a key provided for that purpose. The lock, in addition to controlling the position of the holder, is used in the preferred form of the present invention for securing the separable sections of the device together.

The indicia to be carried by the holder may consist of any identifying indicia peculiar to the vehicle to which the accessory is attached and to the licensed operator thereof. In the preferred form of the present invention, the indicia is carried by a pair of plates, at least one of which is readily removable from the holder. The plates are so mounted on the holder that one plate or the other is concealed in the alternate positions of the holder.

The readily removable plate, in the now preferred embodiment of the invention, is an operator's license, such as is now required in most jurisdictions. This plate is to be mounted on the holder by a licensed operator at all times during which he is operating the vehicle, and is to be removed by him if another licensed operator is to operate the vehicle, the second operator then mounting his license on the holder. This plate is to be visible when the holder thereof is operating the vehicle and is so mounted on the holder as to be visible when the proper operating signal is visible. Thus, not only do the signals indicate whether the vehicle is being operated legally, but the indicia as well.

To render the signals more visible, means are provided, in the preferred embodiment of the present invention, to illuminate the same, and preferably, the means comprise small incandescent lamps located to the rear of the signals which may comprise translucent disks of different colors. The lamps are to be connected into the ignition circuit of the vehicle and the circuit therefor is controlled by the usual ignition switch.

The lamp circuit, in the preferred embodiment of the invention illustrated, is connected across the ignition switch so that if an offender is able to start the vehicle by shunting out or short-circuiting the ignition switch, the signals will nevertheless be illuminated.

Since the circuit for the lamps is controlled by the ignition switch, both signals are illuminated when the ignition circuit is energized, but as one or the other of the signals is concealed by the indicia holder in its alternate positions, only one signal is visible at any one time.

As the translucent disks are of different colors, each will give a distinctive signal, and when the owner or his agent occupies and drives the vehicle, the indicia holder is moved to the position in which the correct signal is visible. Upon parking or leaving the vehicle unattended, the owner or his agent, by merely turning the key may move the holder to its position wherein the signal is visible which indicates that the owner or his agent is not operating the vehicle. The key is removable from the lock so that the holder, once moved to this position, cannot be changed without the key. Thus, if an offender should attempt to drive the vehicle away, the wrong signal would be illuminated and the fact that the car was not being legally driven, would be at once apparent and the offender could be quickly apprehended. Since the lamp circuit is connected across the ignition switch, the signal will be illuminated whether the offender has started the vehicle with the ignition switch key, or by short-circuiting the ignition switch.

To prevent a dishonest person from short-circuiting the ignition switch in such a way as to also short-circuit the lamp circuit of the accessory of the present invention, a second circuit is provided from the usual storage battery of the vehicle. This circuit is not controlled by the usual ignition switch and to prevent this circuit from being continually energized, a switch is provided in the accessory itself. This switch, in the illustrated form of the invention now preferred, is operated incidentally to the movement of the indicia holder by the key. The switch in the position of the holder in which the signal, which indicates that the licensed operator is not in attendance, is visible is in open-circuit position and can be moved to closed-circuit position only by movement of the indicia holder to the other of its positions relative to the casing. Thus, if some person should attempt to operate the vehicle by short-circuiting the ignition switch as well as the lamp circuit controlled by that switch, and the offender did not have in his possession the key for operating the accessory, no signal would be illuminated and it would be apparent to an officer of the law that the vehicle was not being legally operated.

As the lamps are connected into the ignition circuit of the vehicle and controlled therewith, the ignition circuit may be controlled by the switch of the accessory. Thus, should the owner thereof or his agent be unable to operate the ignition switch, either through a mechanical or other defect therein or through loss of the ignition key, it is still possible to operate the vehicle through the switch of the accessory actuated by the key used in moving the indicia holder.

Other features and advantages will hereinafter appear.

In the drawings:

Figure 1 is a perspective view of the front portion of a motor vehicle showing the device of the present invention mounted to the windshield thereof.

Fig. 2 is a view partly in section and partly in elevation showing the device of the present invention.

Fig. 2a is a fragmentary view in section of a part of the device as shown in Fig. 2.

Fig. 3 is a sectional view, taken along line 3—3 of Fig. 2.

Fig. 4 is a sectional view of the casing, taken along lines 4—4 of Fig. 3, and showing parts of the frame of the device of the present invention in broken lines.

Fig. 5 is an elevational view of the device of the present invention, with the indicia holder in the position indicating that the licensed owner is operating the vehicle.

Fig. 6 is a view similar to Fig. 5, but showing the frame and elements carried thereby removed from the casing.

Fig. 7 is a view showing the device of the present invention mounted to the windshield, with the indicia holder moved to the position which indicates that the licensed owner is not in attendance.

Fig. 8 is a rear view of the device of the present invention, mounted to the windshield of the vehicle.

Fig. 9 is a side view of the key used for operating the device of the present invention.

Fig. 10 is an end view of the key.

Figure 11:
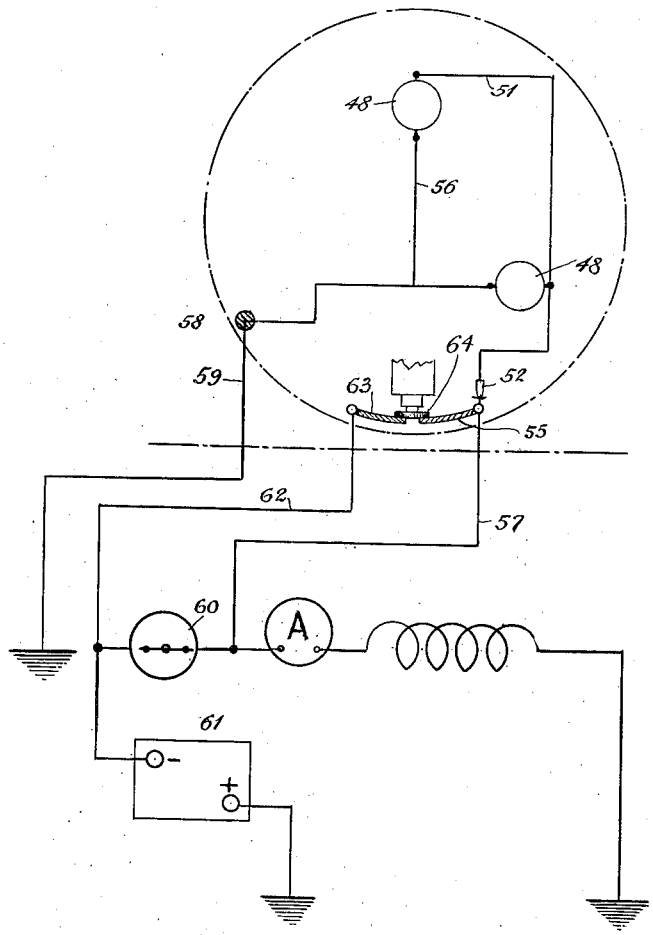
Fig. 11 is a schematic circuit diagram showing the ignition circuit of the vehicle and the circuits used for illuminating the lamps of the present invention.

The accessory of the present invention, referring now to the drawings, comprises an open ended casing 20, which, in the preferred embodiment of the invention, is to be mounted, as shown, to the interior face of the windshield 21 of the vehicle by small bolts 23 having exposed decorative heads 24.

The front wall 25 of the casing, which lies adjacent the interior face of the windshield, is provided with a pair of apertures or windows 26 and 27. A stub shaft 28, centrally carried by the inner face of the wall 25, is formed with a pin 29 projecting from the peripheral surface thereof.

A frame 30, comprising a pair of spaced plates 31 and 32, carries an indicia holder 33 secured to a barrel 34 extending through and rotatably mounted in sleeve 34' on the frame and forming a part of a lock for securing the frame within the casing 20. The indicia holder 33 is clamped between a small plate 35 and a collar 36 by screws 37 which secure this assembly to the one end of the barrel 34. The plate 35 is formed with a centrally disposed keyhole slot 38 leading to an opening milled in the adjacent face of the collar 36. When the frame is inserted into the open end of the casing 20, the shaft 28 projects through the keyhole slot 38 and extends into the opening of the collar 36, the pin being received within an enlarged portion of this opening.

The lock barrel is rotated by a removable key K provided for that purpose, and rotation of the barrel displaces the keyhole slot 38 relative to the pin 29 and the frame is thus locked within the casing. The plate 32 of the frame when mounted within the casing forms a transverse wall closing the open end of the same.

The indicia holder 33, in the preferred embodiment of the invention as illustrated, referring now to Fig. 6, carries a pair of indicia means which may be any identifying indicia peculiar to the vehicle, to which the accessory is attached, and a licensed operator. One of the indicia means preferably comprises a plate 39, which is frictionally held to the holder 33 by clips 40. This plate, in the now preferred embodiment, is an operator's license such as is now required in most jurisdictions. The plate may bear any indicia peculiar to the holder thereof, such as the name and operator's license number, and carries removable numerals indicating the year of operation of the vehicle, the numerals being adhesively or otherwise temporarily secured thereon. The other of the indicia means may comprise, as shown, a plate 41 bearing the license number and the name and address of the owner of the vehicle.

Further indicia are carried by the exposed face of the wall 25 of the casing, and these indicia, as is shown at 42 in Figs. 5 and 7, may comprise such identifying indicia, as the manufacturer's name of the vehicle, the engine number thereof, and other indicia peculiar to the vehicle to which the accessory is attached.

The indicia holder 33, which is rotatable with the lock barrel, rotates in a plane parallel to the plane of the apertured wall 25, and its rotational movement is limited by stops 44 formed on the collar 36, the stops engaging a suitable button 45 carried by the plate 31 and disposed in the path of movement of the stops as the barrel is rotated.

The stops 44, as they limit rotational movement of the holder, define alternate positions to which the holder may be moved. In one of the alternate positions of the holder, the plate 39 is visible through the aperture 27, while in the other of the alternate positions this plate is concealed by a portion of the wall 25, and the plate 41 is visible through the aperture 26.

It is now preferred to mount the plates 39 and 41 to the holder in such a way that plate 39 will be visible while the vehicle is in operation. Thus, means are visible at all times during operation of the vehicle to identify the operator so that should an accident occur, all interested parties to the accident may learn the operator's identity by merely inspecting plate 39.

The plate 39, as it is an operator's license, is to be mounted by the holder thereof to its proper position on the accessory during such time as he is operating the vehicle. This can be done by separating the frame from the casing to expose the indicia holder 33. The frame is readily separable from the casing, for it is only necessary to grasp the key K and pull it outwardly of the lock barrel as it is turned until such time as the pin 29 enters the leg of the keyhole slot 38, whereupon the key can be used as a handle for pulling the frame from the casing.

The plate 31 carries a pair of signals 46 and 47, which, in the preferred embodiment of the present invention, comprise translucent faceted disks of different colors. The disks are so disposed on the plate 31 that they lie directly behind the apertures 26 and 27 formed in the wall 25 of the casing.

Thus it will be seen, referring now to Figs. 5 and 7, that when one indicia plate is visible through one of the apertures, one signal will be visible through the other of the apertures, and movement of the holder to the other of its alternative positions to expose the other indicia plate will bring the other signal into view.

As the translucent disks are of different colors, each will give a distinctive signal, and when the owner or his agent occupies and drives the vehicle, the indicia holder is moved to the position in which the disk 47 is visible. This disk may be any color desired, but preferably is green, while the disk 46 is red. In the use of the accessory of the present invention, the green disk or signal 47 indicates that the licensed owner, or his agent, is operating the vehicle. Upon parking or leaving the vehicle unattended, the owner or his agent, by merely turning the key K, is able to move the holder 31 to its position, wherein the red disk or signal 46 is visible through opening 27, as shown in Fig. 7.

Since the position of the holder is controlled by the key K, and the key is to be removed by the owner from the lock when he leaves the vehicle unattended, no one, except the holder of the key, will be able to move the holder to expose the correct signal for legal operation of the vehicle.

Thus, anyone attempting to drive the vehicle after the owner had left the same would do so with the red signal visible, which act would be quickly noticed by officers, and the offender could be apprehended.

To render the signals more visible, means are provided in the preferred embodiment of the present invention to illuminate the same and preferably the means comprise small incandescent lamps 48 mounted to the plate 31 of the frame 30, which forms a transverse wall intermediate the ends of the casing.

The lamps are disposed to the rear of the disks and are mounted to the transverse wall by small angle brackets 49 carrying contactor shells 50 insulated therefrom. The one contact of each shell 50 is connected by wires 51 to a contact 52, slidably carried by a small housing 53 of the insulating material mounted to the transverse wall 31.

A spring 54 normally urges the contact 52 outwardly of the housing 53 and into engagement with a contact 55 carried by the casing 20 which is connected into the current supply circuit of the vehicle. The other contact of each shell 50 is grounded by suitable wires 56 to the transverse wall 31.

The circuit for the lamps, in the now preferred manner in which the circuit is connected in the current supply circuit of the vehicle, is shown schematically in Fig. 11. In this schematic showing of the circuit arrangement, the lamps 48 are connected through the spring-urged contact 52 to contact 55, which in turn is connected by a lead 57 to the ignition circuit of the vehicle. The transverse wall 31, to which the lamps are grounded, is connected to some suitable ground on the vehicle through a pin 58 carried by the wall 25 of the casing, and a suitable wire 59. It will be seen that when the ignition switch 60 is closed, current will flow from the battery 61 through switch 60, lead 57, contacts 55 and 52, and thence through the two lamps 48 to ground. Thus, both lamps will be illuminated when the ignition switch is closed, but as one or the other of the signals is concealed by the indicia holder in its alternate positions, only one signal is visible at any one time.

If an offender should be able to start the vehicle by shunting or short-circuiting the ignition switch 60, the lamps will even then be illuminated, for unless the ignition switch, as well as the lead-in conductor 57, are shunted out, the energization of the ignition circuit will cause the lamps to be illuminated.

To circumvent the accessory from being shunted out or short-circuited, a lead may be taken directly from the battery 61 by the wire 62 to a contact 63 carried by the casing 20. The contact 63 is insulated from casing 20 and forms a part of a normally open switch for controlling the circuit for the lamps.

In the specific embodiment of the invention illustrated, the switch comprises the contact 63, the contact 55 and a bridging contact 64. The bridging contact 64 is mounted to the transverse wall 31, but is insulated therefrom, and is normally held by a spring 65 in a retracted position out of engagement with the contacts 55 and 64. The contact 64 carries at one end the button 45 which forms a follower for an eccentric cam 66 formed on the side edge of the collar 36. The cam 66, as it is rotated by rotation of the barrel 34, will cam the button 45 and the contact 64 against the action of the spring 65 into bridging engagement with the contacts 55 and 63 when the holder is moved to expose the green signal.

The bridging of the contacts 55 and 63 will energize both lamps even though the ignition switch remains in open-circuit position, for the circuit from the battery includes the wire 62, contacts 63, 64 and 55, 52, and thence through the lamps to ground.

Thus, if a dishonest person, with the car unattended and the red signal exposed was able to start the vehicle by shunting out the ignition switch and in so doing also shunted out the lead-in conductor 57, he would be able to start the vehicle, but in so energizing the ignition circuit it would not be possible to energize the lamp circuit, and, consequently, if he attempted to operate the vehicle the lamps would not be illuminated and an officer would be apprised of the fact that the vehicle was being operated illegally.

If the licensed owner is not able to operate the ignition switch either through a mechanical defect therein or through loss of the ignition switch, he would still be able to start the vehicle by use of the key K and the switch formed by contacts 55, 64 and 63.

If such an accident occurred, the ignition and lamp circuits would be energized upon movement of the indicia holder to a position in which the green signal is visible, for the bridging contact 64 would be moved to operative position incident to movement of the indicia holder to the proper driving position.

With the holder in proper operating position, the ignition circuit would be energized through the circuit established by the wire 62, contacts 63, 64 and 55, and wire 57. The circuit for the lamps 48, under these circumstances, is the same as previously explained when the bridging contact is cammed into engagement with the contacts on the casing.

The accessory of the present invention will materially reduce theft of vehicles, especially where use of the accessory is made mandatory by the vehicular laws of a State. Where each licensed vehicle is equipped with the accessory of this invention, a law enforcement officer would be able to ascertain whether a vehicle was being driven by its licensed owner or his agent, by merely ascertaining what signal was visible through the windshield of the vehicle.

The use of the present accessory would materially reduce thefts from parking areas where it is necessary for the owner of the vehicle to leave the usual ignition key in the ignition lock so that the attendant can move the vehicle if necessary. Before leaving the vehicle on such areas, the owner would move the indicia holder to its position in which the red signal is exposed and then remove the key K so that even though someone should surreptitiously drive the vehicle from the parking area, he would not be able to drive any great distance before an officer would apprehend him.

Variations and modifications may be made within the scope of this invention and portions of the improvements may be used without others.

I claim:

1. In a device of the type described, a casing to be mounted to a vehicle; a support housed by said casing; a pair of visible signals carried by said support; an indicia holder rotatably mounted on said support; and a pair of indicia means carried by said holder, said holder being movable to alternate positions on said support wherein one or the other of said indicia means is visible, the indicia means visible in either position of said holder concealing one of said signals.

2. In a device of the type described, a casing adapted to be mounted to a vehicle with the one face thereof visible through the windshield thereof; a support housed within said casing; a pair of signals carried by said support and disposed adjacent a pair of apertures formed in said face so as to be visible through the windshield of said vehicle; means rotatably mounted on said support and movable to alternate positions in which one or the other of said signals is concealed thereby; and means including a removable actuator for moving said means to the alternate positions thereof whereby the actuator may be carried on the person of the operator of the vehicle when away from the same to prevent unauthorized changing of the signal.

3. In a device of the type described, a casing having a wall thereof formed with a pair of apertures; means for mounting said casing to the windshield of a vehicle with the apertured wall thereof facing the direction of forward motion of the vehicle; a pair of visible signals supported within said casing, a signal being visible through each aperture; a support under the control of the operator of the vehicle rotatably mounted within said casing and movable to alternate positions therein; and a pair of indicia means carried by said support, one of said indicia means being alternately visible through one of said apertures in alternate positions of said support, the indicia means visible in either position of said support concealing one of said signals.

4. In a device of the type described, a casing having a wall thereof formed with a pair of apertures; means for mounting said casing to the windshield of a vehicle with the apertured wall thereof facing the direction of forward motion of the vehicle; a pair of translucent disks of different color supported within said casing; a lamp mounted to the rear of each disk; a circuit for said lamps; means for connecting said circuit into the ignition circuit of said vehicle for control therewith; and means rotatably mounted within said casing and movable to alternate positions in which one or the other of said disks is concealed thereby.

5. In a device of the type described, a casing having one wall thereof formed with a pair of apertures, said casing adapted to be mounted to a vehicle with the apertured wall thereof visible through the windshield of the same; a signal disposed behind each aperture; and indicia mounting means movable to one of two positions relative to said casing; a pair of indicia means mounted to said last-named means, said indicia means being alternately visible through said apertures as the mounting means is moved to its alternate positions, one or the other of said signals being concealed by said mounting means in either of the alternate positions thereof.

6. In a device of the type described, a casing having a wall thereof formed with a pair of apertures; means for mounting said casing to the windshield of a vehicle with the apertured wall thereof facing the direction of forward motion of the vehicle; a pair of translucent disks of different color supported within said casing; a lamp mounted to the rear of each disk; a circuit for connecting said lamps to the usual source of current supply of said vehicle; a normally open switch in said circuit; means rotatably mounted within said casing movable to alternate positions in which one or the other of said disks is concealed thereby; and means operative by movement of said last-named means to one of said alternate positions for closing said switch.

7. In a device of the type described, a casing having a wall thereof formed with a pair of apertures; means for mounting said casing to the windshield of a vehicle with the apertured wall thereof facing the direction of forward motion of the vehicle; a pair of translucent disks of different color supported within said casing; a lamp mounted to the rear of each disk; a circuit for said lamps; means for connecting said circuit into the ignition circuit of said vehicle for control therewith; means rotatably mounted within said casing and movable to alternate positions in which one or the other of said disks is concealed thereby; and means for locking the last-named means in one of said alternate positions.

8. In a device of the type described, a casing having a wall thereof formed with a pair of apertures; means for mounting said casing to the windshield of a vehicle with the apertured wall thereof facing the direction of forward motion of the vehicle; a pair of translucent disks of different color supported within said casing; a lamp mounted to the rear of each disk; a circuit for connecting said lamps to the usual source of current supply of said vehicle; a normally open switch in said circuit; means rotatably mounted within said casing movable to alternate positions in which one or the other of said disks is concealed thereby; means operative by movement of said last-named means to one of said alternate positions for closing said switch; and means for locking said first-named means in the other of its alternate positions.

9. In a device of the type described, a casing having the one end thereof closed by a transverse wall formed with a pair of apertures; a frame removably supported within said casing; a pair of signals mounted on said frame, each visible through one of said apertures; means rotatably mounted on said frame and movable to alternate positions in which one or the other of said signals is concealed thereby; and means for moving said rotatably mounted means, said means including means for locking said frame within said casing.

10. In a device of the type described, a casing having the one end thereof closed by a transverse wall formed with a pair of apertures; a frame removably supported within said casing; a pair of signals mounted on said frame, each visible through one of said apertures; an indicia holder rotatably mounted on said frame and movable to alternate positions on said frame; a pair of indicia means carried by said holder; one of said indicia means being visible through one of said apertures in alternate positions of said holder; means for moving said holder, said means including means for locking said frame within said casing; and means for actuating said last-named means.

11. In a device of the type described, a casing having a wall thereof formed with a pair of apertures; means for mounting said casing to the windshield of a vehicle with the apertured wall thereof facing the direction of forward motion of the vehicle; a pair of translucent disks of different color supported within said casing; a lamp mounted to the rear of each disk; a circuit for said lamps; means for connecting said circuit into the ignition circuit of said vehicle for control therewith; an auxiliary circuit for connecting said lamps directly to the source of current supply of said vehicle; a normally open switch in said last-named circuit; means rotatably mounted within said casing and movable to alternate positions in which one or the other of said disks is concealed thereby; and means operative by movement of said last-named means to one of said alternate positions for closing said switch.

12. In a device of the type described, a casing to be mounted to a vehicle; a pair of signals carried within said casing; means for mounting indicia within the said casing; and a pair of indicia means carried by said mounting means, one of said indicia means comprising a readily removable plate bearing indicia peculiar to a licensed operator, said mounting means being movable to alternate positions wherein one or the other of said indicia means is visible through the windshield of the vehicle, the indicia means visible in either position of said mounting means concealng one of said signals.

BERNARD H. SKELLY.